Dec. 31, 1963  E. L. SMITH  3,116,152
BABY FOOD CONTAINER AND SPOON COMBINED
Filed Jan. 22, 1959
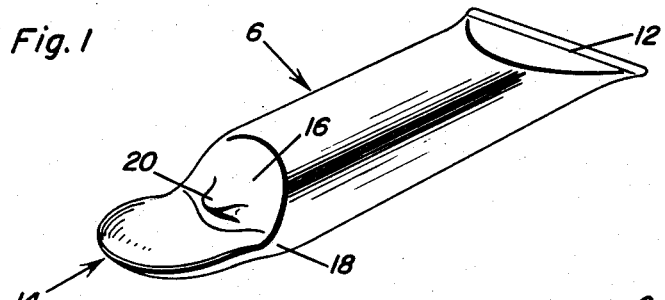
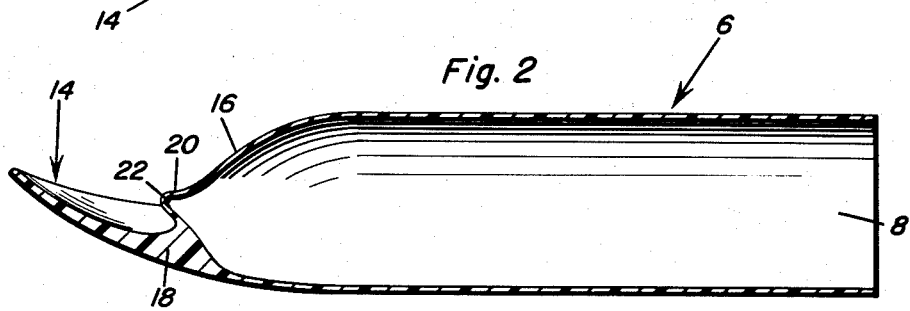
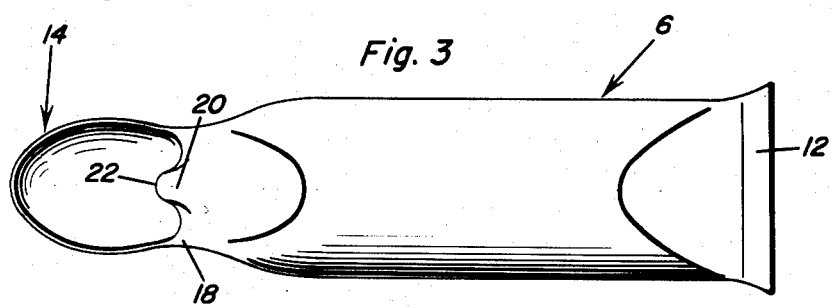
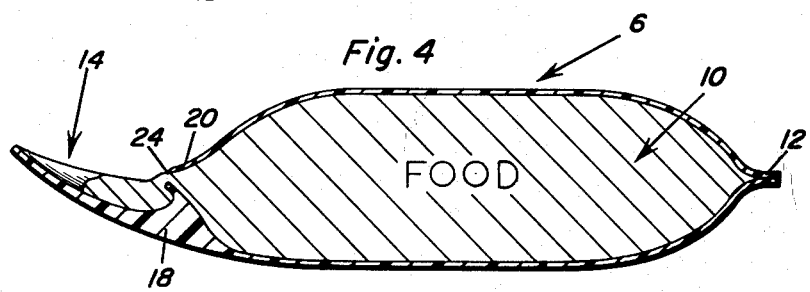
Elmer L. Smith
INVENTOR.

United States Patent Office 3,116,152
Patented Dec. 31, 1963

3,116,152
BABY FOOD CONTAINER AND SPOON COMBINED
Elmer L. Smith, Seat Pleasant, Md. (14079 Dumbarton Drive, Brock Hall Estates, Upper Marlboro, Md.)
Filed Jan. 22, 1959, Ser. No. 788,333
3 Claims. (Cl. 99—171)

This invention relates to multipurpose unit which, as the title reveals, comprises a unique feeder which is expressly, but not necessarily, made and adapted to expeditiously and conveniently serve baby food to an infant.

More particularly it has to do, in a manner of speaking, with a simple and practical spoon in that, broadly construed, it is characterized by a hollow food containing and dispensing "handle" which is provided at the discharge end thereof with an integral spool bowl. On the other hand it may be alternatively construed as a container (a collapsible tube) charged with baby food and having a spoon (or spoon bowl) at the food dispensing end of the container.

Stated more explicitly the invention pertains to a collapsible tube of suitable size and shape which constitutes a container for prepared baby food and which also serves as a handle. The spoon or bowl as it is sometimes called, is a continuation or extension of the tube in that it is formed integrally with the forward or discharge end of the tube and is so located that the main receptacle portion is about even with or below the longitudinal central portion of the tube for practical one-handed feeding requirements. In addition, the forward end of the tube is formed with a conical or an equivalent tapering projection which constitutes a nipple. The tip or apical end of this is severed and thus defines a practical discharge opening which delivers the progressively squeezed amount of food into the bowl for consumption making it possible to take care of the feeding job with one hand while holding the baby with the other hand.

Because the spoon is embodied at the front end of the container or tube, it is not necessary to carry a regular baby feeding spoon when traveling. There is nothing to wash and clean before feeding, because the ready-to-use multipurpose feeder or unit is sealed in a germ-free envelope or equivalent wrapper or package. There is no spoon or dish to bother with after feeding because the then used feeder and remaining food, if any, may be thrown away. When using the feeder, one hand operation is feasible because the food container and spoon are one and the same. There is no separate food jar, dish or can to be held as is usually the case. Consequently, one using this novel unit or feeder employs one hand leaving the other hand free for holding the baby.

Food is delivered to the spoon by a gentle squeezing of the tube or container. The food passes through the severed tip. A very exact amount can be delivered to the spoon by varying the pressure when squeezing the tube. The feeder is spill-proof and may be set aside without danger. Because of this practical result, several different feeders containing different foods, can be opened at the same time to provide the variety that may be desired or necessary. As each feeder is used the others may be laid aside without danger of spilling or displacement.

The exact size of the tube would be determined by the type of food it is to contain. For example, a feeder containing strained vegetables would be larger than one containing strained meat. A feeder containing prepared baby cereal mixed with milk and fruit would be larger than the one containing either strained vegetables or strained meat. Since the feeder is designed for single use and is to be thrown away after one feeding, it would be desirable that the amount of food provided be near the prerequisite quantity consumed at one feeding. This accomplishment will vary with the age and eating habits of each baby, but an average size can be determined.

The feeder would normally be shelf-stored at room temperature. It could be heated, if necessary, by placing the unopened unit into hot water for a few minutes prior to use.

Other objects, features and advantages will become more readily apparent from the following description and the accompanying drawing.

In the drawing wherein like numerals are employed to designate like parts throughout the views:

FIG. 1 is a perspective view of the improved feeder showing the same in the manner that it appears after having been removed from a box, protective envelope or other package in which it will be sold at the store.

FIG. 2 is an enlarged view, that is, a central longitudinal central view with the empty tube shown, that is before the food has been placed therein and the tube has been sealed.

FIG. 3 is a top plan view of the complete feeder appearing in FIG. 1.

FIG. 4 is a central longitudinal sectional view through the construction seen in FIG. 3 but illustrating the manner in which the nipple has been opened and the first charge of food has been pressed or squeezed into the receptacle portion of the spoon.

By way of introduction to the description of the details it is to be explained that while the description suggests the use of the novel feeder for travel purposes it is obvious that it is also well adapted for use in the home and elsewhere. In addition, while the invention is essentially one which is recommended for use as a container and feeder for infants and small children, it is obvious that it is capable of being used when a nurse or an attendant is called upon to feed invalids, feeble persons and handicapped patients requiring feeding and perhaps those who find it advisable or necessary to take baby foods.

It is further to be explained that the unit is most likely to be made of a satisfactory soft pliable plastic for example polyethylene. In fact, it is to be assumed that it will be molded from one-piece. In addition, the nature of the material will have to be considered by the manufacturer to bring it within the category of disposable or throw-away devices.

In the drawing in FIG. 2 the collapsible tube (also container or handle) is denoted by the numeral 6. Here the right hand end is shown open to receive the food contents 10 (FIG. 4). After the tube has been filled it is seamed and sealed by heat treatment or in a customary manner providing a closed end portion 12. The spoon or spoon bowl is of suitable shape and size and comparatively rigid and is denoted generally by the numeral 14. The intake end of the receptacle part of the spoon is joined to the forward end portion 16 of the tube or container by a thickened portion 18 which serves to reinforce and rigidify this joint. Also the point of connection is such that the receptacle of the spoon will be in the proper plane relative to the axis of the tube. Then, too, the forward end portion tapers gradually where it merges into a relatively small extension or projection 20 which is referred to as a collecting and discharge nipple. The tip or apical portion 22 will be made so that it may be readily snipped off to thus provide a discharge opening as at 24 in FIG. 4. The point of location of the nipple is proper in relation to the intake part of the receptacle of the spoon so that the discharged food is piloted into the receptacle with requisite nicety. In fact, it may be said because of the generally tapering forward end 16 and the nipple that the food is funneled into the spoon.

Manifestly, the feeder is filled with food and sealed at the factory. The entire unit is then sealed in a cellophane or light plastic envelope or a suitable package or container so that it will be acceptably germ-free until used. It has been previously mentioned but may be repeated that the principal application of this invention is for convenient practical feeding of a baby while travelling. On the other hand, it may be used at home and for other purposes already set forth.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A throw-away baby food containing and feeding unit for single-handed use comprising a collapsible tube containing a predetermined quantity of non-solid food and being of a cross-sectional dimension that it may be utilized as a handle, said tube having a forward end provided with a conical axially located outwardly projecting integral discharged nipple, said nipple, when opened, enabling the food in the container to be progressively ejected and thus dispensed for use, the apical tip portion of said nipple being easily openable when severed so that one catching hold of the tube and squeezing it and compressing the container discharges the food in the tube and thus discharges it in a restricted quantity, and a spoon having a bowl integrally joined and thus combined with the forward end of said tube, that portion of the construction providing the junctional joint between the spoon and tube being substantially rigid and said nipple overhanging the bowl of the spoon with which it cooperates.

2. The structure defined in claim 1 and wherein the bowl of said spoon is in alignment with the nipple, said spoon being located in a plane generally below the plane of the axial center of the nipple to bring the spoon and nipple into satisfactory cooperative relationship in a manner to dispense the food from the tube and nipple into the spoon.

3. A food containing and feeding unit including a container, a quantity of non-solid food disposed in said container at a processing plant whereby the container may be effectively employed as a shipping and storage container for such food until the food is consumed while preserving the food in an edible state, said container comprising an elongated tube constructed of flexible material with both ends thereof sealed for maintaining food disposed therein in a preserved state, a spoon bowl extending longitudinally from one end of said tube and being of one piece construction with the tube, said spoon bowl having an upwardly facing concave surface and generally forming an axial extension of the tube whereby the tube forms a handle for manipulating the spoon bowl whereby the spoon bowl may be placed in the mouth and food removed from the concave surface thereof in the conventional manner of employing a spoon, said tube having a severable, sealed nipple projecting from one end thereof and overlying the inner end of the concave portion of the spoon bowl whereby the spoon bowl serves to protect the nipple and also to receive food passing therethrough, said nipple being constructed of pliable plastic material, said tube and spoon bowl being constructed of plastic material whereby the non-solid food may be warmed while in the container prior to severing the sealed nipple thus facilitating the preparation of the food for consumption, the necessity of holding the tube in the hand and squeezing the tube when dispensing food enabling the person holding the tube to determine the temperature thereof.

References Cited in the file of this patent

UNITED STATES PATENTS

| | | |
|---|---|---|
| 1,000,178 | Kahl | Aug. 8, 1911 |
| 2,252,119 | Edmonds | Aug. 12, 1941 |
| 2,453,525 | McNeil | Nov. 9, 1948 |
| 2,648,463 | Scherer | Aug. 11, 1953 |
| 2,698,996 | Hickerson | Jan. 11, 1955 |
| 2,837,822 | Wille | June 10, 1958 |
| 2,859,515 | Kinman | Nov. 11, 1958 |

OTHER REFERENCES

"Food," March 1953, page 17.